United States Patent [19]

Macks

[11] Patent Number: 5,036,437
[45] Date of Patent: Jul. 30, 1991

[54] VEHICLE LAMP CONTROL SENSOR

[75] Inventor: Harold R. Macks, Royal Oak, Mich.

[73] Assignee: Lectron Products, Inc., Rochester Hills, Mich.

[21] Appl. No.: 577,206

[22] Filed: Sep. 4, 1990

[51] Int. Cl.⁵ ............................................... B60Q 1/04
[52] U.S. Cl. ...................................... 362/61; 362/276; 362/293; 315/159
[58] Field of Search ................... 362/61, 80, 276, 293, 362/802; 315/159

[56] References Cited

U.S. PATENT DOCUMENTS 1,981,985  11/1934  Braselton ......................... 362/276 X
3,673,421   6/1972  Hicks et al. ...................... 362/276 X
3,706,005  12/1972  Carlson ............................ 362/276 X

*Primary Examiner*—Stephen F. Husar
*Attorney, Agent, or Firm*—Harness, Dickey & Pierce

[57] ABSTRACT

A vehicle lamp control sensor for switching a lamp on or off depending on ambient levels. The device employs a silicon photodetector in combination with a filter chosen to give the detector a response curve that peaks at about 550 nanometers. This gives the control sensor the same proximate spectral response as the human eye. The photo detector transmits an electrical signal in response to the ambient light. The electrical signal is sensed by a lamp switching circuit to switch the vehicle lamp at predetermined light levels. The vehicle lamp control sensor will thus respond to changes in the ambient light levels in a manner which matches the perceived light levels of a human observer.

15 Claims, 3 Drawing Sheets

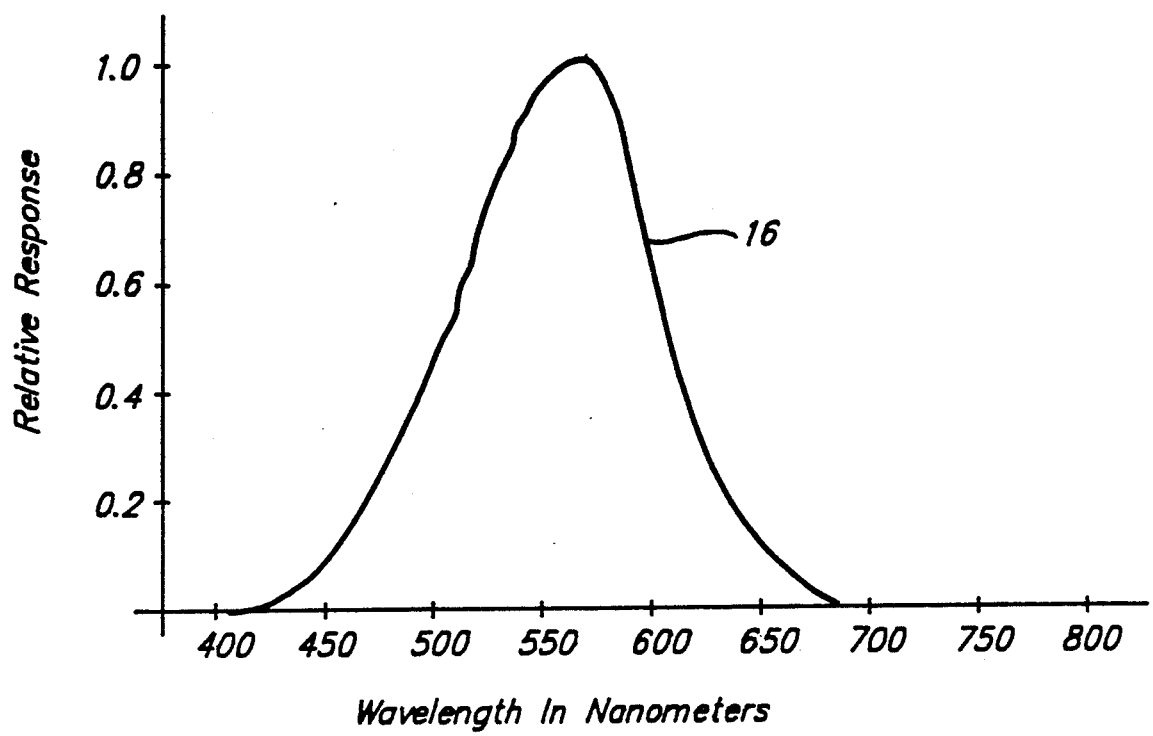
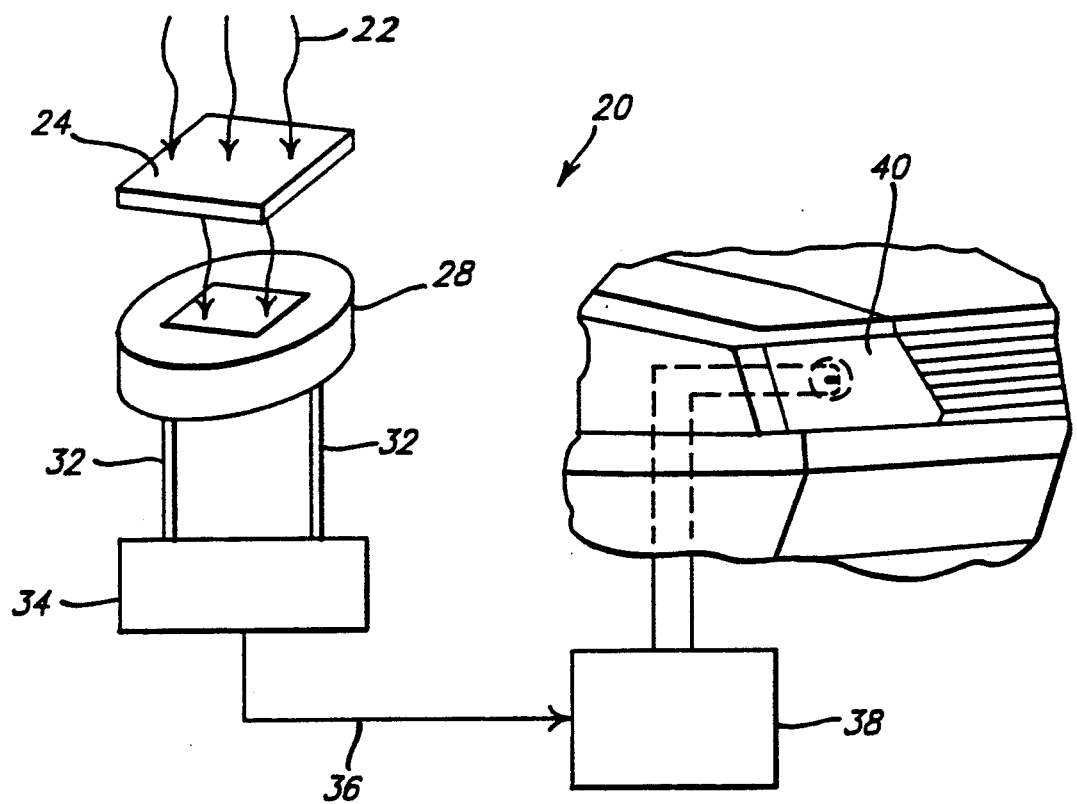

VEHICLE LAMP CONTROL SENSOR

BACKGROUND AND SUMMARY OF THE INVENTION

This invention relates to a vehicle lamp control sensor and particularly to such a sensor with a response curve that resembles that of the human eye.

A number of systems have been developed to eliminate the necessity for manually turning on and off vehicle lamps. Such systems typically employ a photocell to detect ambient light levels. The photocell is then coupled to a switch for turning a lamp on or off in response to the level of the ambient light. Examples of such systems include auto headlamp control sensors which automatically turn head lamps on in the dark, and off in daylight.

Such systems generally employ a photocell such as a cadmium sulfide photoconductive cell with a photocell filter to provide an electrical response that varies with changing ambient light levels. In particular, cadmium sulfide photocells change their resistance as the light level changes, and this resistance change is sensed by a level detector in a control circuit to turn the lamp on or off at preset levels.

The use of cadmium sulfide photocells in lamp control sensors presents a number of problems. First, photocells are somewhat sensitive to temperature. This results in an undesirable change in the response of the system with temperature. Further photocells exhibit significant drift in sensitivity over time. Also, due to manufacturing processes, photocells can vary significantly between manufacturing lots. This can result in undesirable variation in the spectral response between otherwise identical photocells.

Moreover, photocells have a spectral response curve that differs significantly from the spectral sensitivity of the human eye. Because of the enhanced response of photocells in the blue end of the visible spectrum, even with suitable filtering, photocell based systems are quite unlike the human eye in their spectral response. As a consequence, a photocell sensor will switch lights on or off at times that may appear inconsistent and inappropriate to the human observer. For example, a typical photocell type sensor may have a response curve that has a maximum response at about 525 nanometers. The human eye has a maximum response in the green region of the visible spectrum at about 550 nanometers under photopic (daylight) conditions. When it is cloudy outside, the clouds cause a shift in the spectral composition toward the blue region. To a human observer, it therefore appears to get darker outside even if the overall light level has not changed, since the observer has less sensitivity in the blue region. This is partially due to the loss of red wavelengths which effects the photocell more than the eye. The photocell, on the other hand, may show an increased response on a cloudy day due to its increased sensitivity in this region. Thus, the photocell perceives it to be less dark than the human because the cloudy sky is rich in the blue spectrum. As a result, for example, the photocell will not turn lights on in cloudy conditions at a time when to a human observer it appears dark enough for the lights to be on.

Thus, it is desirable to have an automatic vehicle lamp sensor which is not sensitive to temperature, and which exhibits a consistent spectral response between manufacturing lots. Further, it is desirable to have a vehicle lamp sensor that has a spectral response curve that more closely matches that of the human eye so that its responses will match perceived changes in light levels.

A lamp sensor achieving the above-mentioned desirable features, is provided according to this invention. The lamp sensor includes a sensor, such as a photodiode, for receiving ambient light and for providing an electrical signal in response to the ambient light. In addition, a filter means is positioned between the sensor and the ambient light for selectively transmitting particular wavelengths of the ambient light to the sensor. The filter has a spectral transmissivity curve such that the combination of the sensor and filter yield a spectral response that approximates that of the human eye. Finally, the sensor is coupled to a means for turning a lamp on and off at predetermined ambient light levels.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a graph of the photopic spectral sensitivity curve of the human eye.

FIG. 4 is a block diagram of a lamp control sensor system in accordance with the present invention.

DETAILED DESCRIPTION OF THE INVENTION

Figure 1:
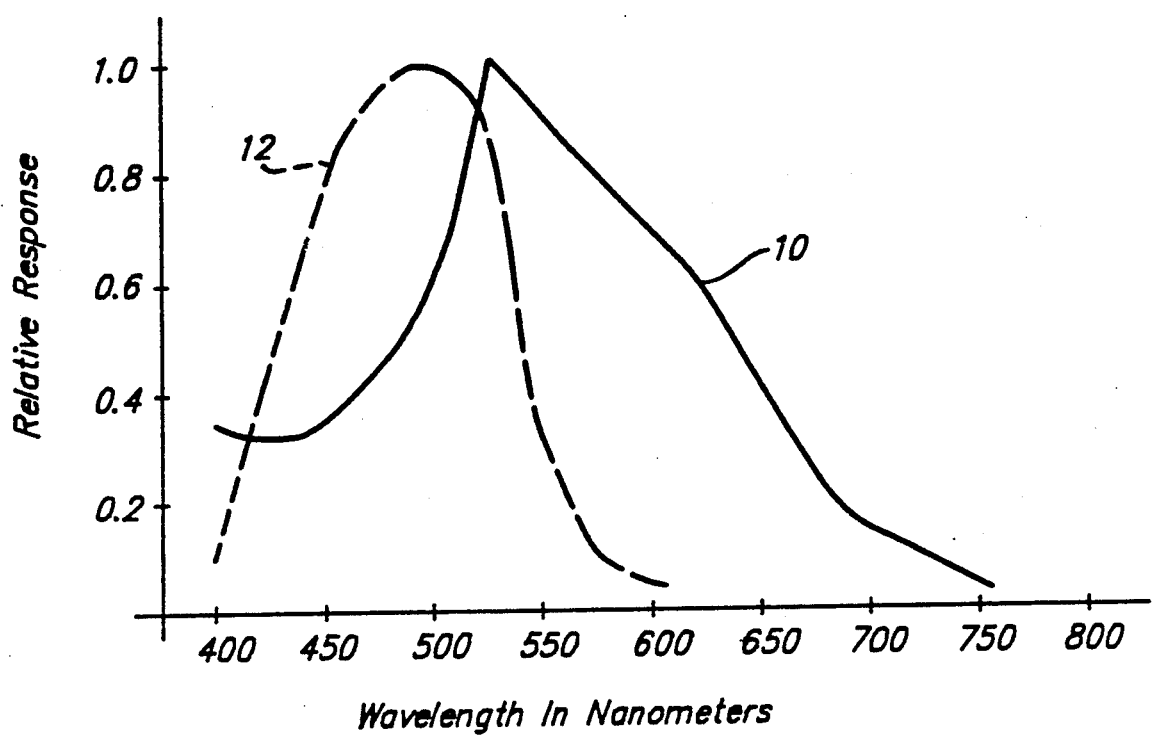
FIG. 1 is a graph of the response curves of a conventional photocell and a conventional photocell filter as a function of wavelength.

FIG. 1 illustrates a graph of the response curve of a conventional prior art photocell and photocell filter. The photocell curve 10 shows the relative response of a conventional cadmium sulfide photoconductive cell normalized so that the maximum response is equal to 1.0 on the vertical axis. The relative response is plotted as a function of wavelength in nanometers. It will be appreciated that the photocell curve 10 is typical of many photocell curves, but that variations will occur between different types of photocells and even between different manufacturing lots of the same type of photocell. It is important to note that the photocell curve 10 exhibits a relatively strong response in the violet and blue region of the spectrum (400-500 nanometers) and reaches a maximum in the green region at 525 nanometers.

Figure 2:
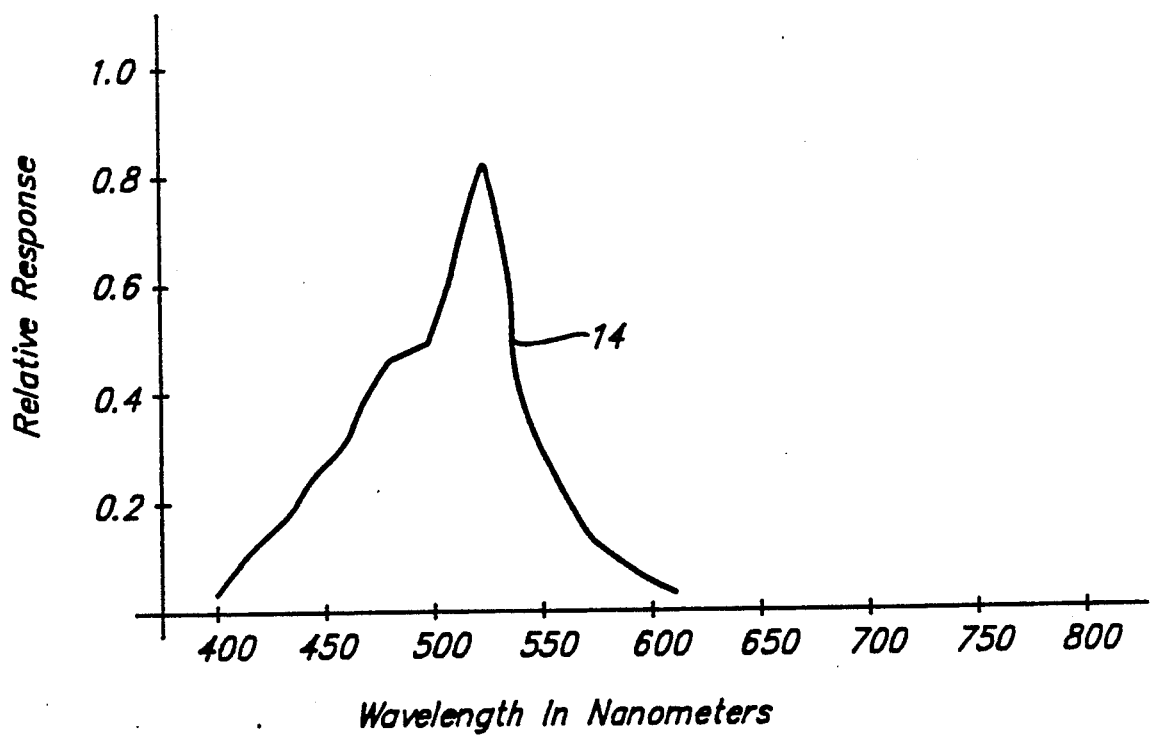
FIG. 2 is a graph of a response curve for a combined conventional photocell and photocell filter system.

Also shown in FIG. 1, is a relative response curve 12 of a typical photocell filter. It can be seen that a typical photocell filter exhibits a maximum response, or transmissivity, at about 500 nanometers and transmits much less light in the orange and red regions beyond 600 nanometers. By combining the above photocell curve 10 and photocell filter curve 12, conventional lamp control sensors typically exhibit an overall response curve 14 as shown in FIG. 2. Note that this curve 14 reveals a relatively sharp peak at around 525 nanometers.

Referring now to FIG. 3, there is shown a typical spectral sensitivity curve 16 of an average human observer in daylight. This curve 16 exhibits a peak at around 560 nanometers, while the combined photocell and filter curve 14 peak was at about 525 nanometers.

The problem with the mismatch between the responses of the conventional photocell with a conventional filter and the human observer can be illustrated by an example. Assume that the conventional photocell with filter is attached to a vehicle lamp control sensor which is designed to turn on lights when it is dark and turn them off again in daylight. It will be appreciated that the spectral distribution of ambient light, and hence, the response of a photocell will be affected by the cloudiness of the ambient daytime light. For example, since clouds tend to scatter more blue light than red light, if on a given day the sky clears, the predominant spectral distribution of the ambient light will shift toward the red. To a human observer it will appear to get brighter outside by a given amount, determined by the human sensitivity curve 16 in FIG. 3. However, a conventional photocell and filter may not experience as much of an increase in brightness due to its different sensitivity curve, shown as curve 14 in FIG. 2. As a result, the photocell may not turn lights off when it appears appropriate to do so to the human.

To avoid this problem, the present invention employs a silicon photodiode and filter in combination to provide a combined response that more closely approximates that of the human eye. Referring to FIG. 4, an automotive headlamp control system 20 is shown. Ambient light 22 is received by a filter 24, which may be a Schott glass type BG-18 filter. This filter has a response curve that exhibits a peak at about 500 nanometers as illustrated by curve 26 in FIG. 5. Alternatively, filter 24 may be constructed of doped plastic or, instead, an interference filter could be used.

Figure 5:
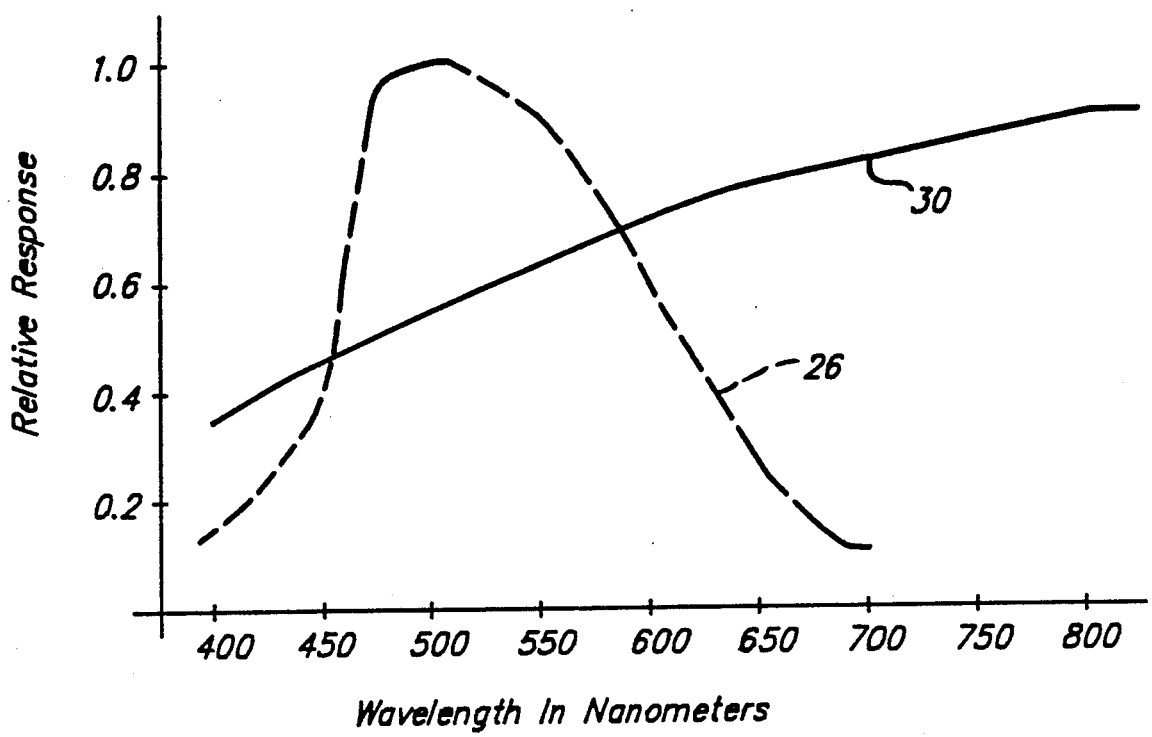
FIG. 5 is a graph of the response curves of a silicon photodetector and filter.

Ambient light having been filtered by the filter 24, is received by a silicon photodiode sensor 28. This conventional photodiode may be, for example, a model number VTB9413 manufactured by Vactec Opto Electronics Division of EG&G, St Louis, Mo. FIG. 5 illustrates the response curve 30 of this photodiode sensor 28. It will be appreciated that the photodiode photodiode sensor 28. It will be appreciated that the photodiode 28 generates a current that is dependant on wavelength and also proportional to the intensity of the ambient light 22 received. This current is fed through conductors 32 to an amplifier 34. The amplified current is then fed along conductor 36 to a lamp control circuit 38, which may include an adjustable level detector and a relay (not shown) to turn a headlamp 40 on and off. It will be appreciated that other types of filters 24 and photodiodes 28 may be employed having response curves similar to those shown in FIG. 5.

Figure 6:
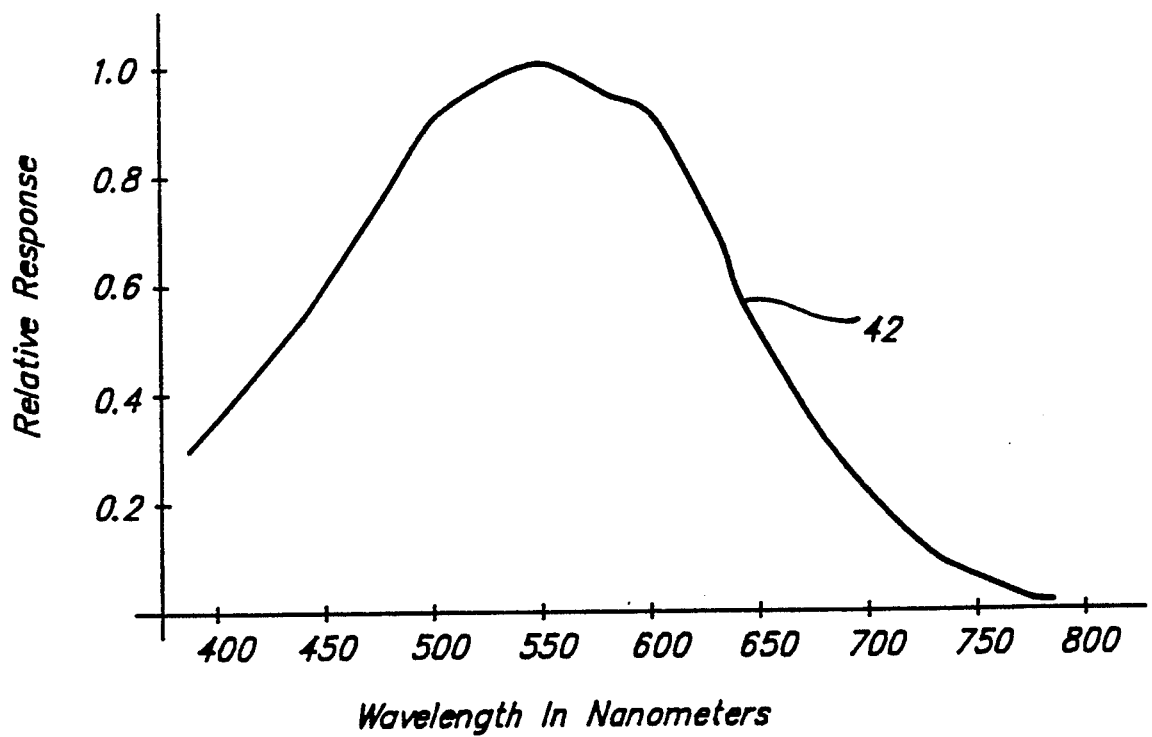
FIG. 6 is a graph of the combined response curve of the combined silicon sensor filter curves shown in FIG. 5.

Referring now to FIG. 6, a response curve for the combined photodiode 28 and sensor 24 is shown as curve 42. It is important to note that this curve 42 exhibits a maximum response at a wavelength of about 550 nanometers. This compares favorably with the spectral sensitivity curve 16 of the human eye shown in FIG. 3. The lamp control system 20, by closely approximating the spectral response curve of the human eye, exhibits changes in sensitivity that parallel those of the human eye. As a result, changes in apparent light levels perceived by a human observer due to changes in the spectral composition of ambient light will be tracked by changes in the response curve of the lamp control sensor system 20.

It should also be noted that in FIG. 5 the response curve 30 of the photodiode 28 exhibits a very high response in the infrared region (greater than 700 nanometers in wavelength). Thus, it is important to choose a filter 24 which effectively blocks the infrared region (as shown by curve 26) to insure that the lamp control sensor system 20 does not respond in this region. This yields a better correlation with the spectral response of the human eye as shown in FIG. 3.

It will be appreciated that curve 42 does not have as sharp a peak as curve 16. This, however, does not present a problem since this difference is not readily perceivable by the human observer. The important feature is that curve 42 peaks at approximately the same wavelength as the human eye curve 16 so that the slope of the curves have the same signs (positive or negative) at all points throughout the visible spectrum. This insures that the lamp control system 20 does not decrease in sensitivity in regions where the eye is increasing in sensitivity, and vice versa. However, it will be appreciated that depending upon the cost constraints of the particular application, a photodiode 28 and filter 24 can be designed to provide an even better approximation to the human eye curve 16.

It should also be noted that photodiode 28 has the further advantage of being extremely stable throughout a relatively wide temperature range. Conventional photocells, on the other hand, are very sensitive to temperature and also exhibit drift in sensitivity over time. A further advantage is that a photodiode 28 can be manufactured to produce a well controlled and repeatable response curve 30. In contrast, conventional photocells exhibit considerable variation from manufacturing lot to manufacturing lot.

While the above description constitutes the preferred embodiments of the present invention, it will be appreciated that the invention is susceptible to modification, variation and change without departing from the proper scope and fair meaning of the claims.

What is claimed is:

1. An apparatus for controlling a vehicle lamp comprising:
   sensor means for receiving ambient light, said sensor means providing an electrical signal in response to said ambient light;
   filter means disposed between said sensor means and said ambient light for selectively transmitting said ambient light to said sensor means, said filter means having a spectral transmissivity curve such that the combination of the sensor means and filter means will have a spectral response that approximates the spectral sensitivity curve of the human eye; and
   means responsive to said sensor means for turning said vehicle lamp on or off at predetermined ambient light levels.

2. The apparatus of claim 1, wherein said sensor means alone has a spectral response curve that is generally linear, and increasing with the wavelength of said ambient light.

3. The apparatus of claim 1, wherein said lamp is an automotive headlamp.

4. The apparatus of claim 1, wherein said sensor means is a silicon photodiode.

5. The apparatus of claim 1, wherein said filter means is a BG-18 type filter.

6. A vehicle lamp control sensor comprising:

photodetector for receiving ambient light, and providing an electrical signal in response to said ambient light; and filter disposed between said photodetector and said ambient light for selectively filtering predetermined wavelengths of said ambient light, wherein said filter has a spectral transmissivity such that the combination of the photodetector and the filter will have a response curve that approximates the spectral sensitivity curve of the human eye.

7. The vehicle lamp control sensor of claim 6 wherein said said photodetector alone has a spectral response curve that is generally linear, and increasing with the wavelength of said ambient light.

8. The vehicle lamp control sensor of claim 6 wherein said lamp is an automotive headlamp.

9. The vehicle lamp control sensor of claim 6 wherein said photodetector is a silicon photodiode.

10. The vehicle lamp control sensor of claim 6 wherein said filter is a BG-18 type filter.

11. The vehicle lamp control sensor of claim 6 wherein said photodetector signal is a varying current signal, and said means responsive to said photodetector responds to predetermined levels of said current.

12. A headlamp control system for a motor vehicle comprising:

photodiode for receiving ambient light in the vicinity of said vehicle, said photodiode providing a current signal in response to said ambient light;

filter means disposed between said photodiode and said ambient light for selectively transmitting said ambient light to the photodiode, the filter means being chosen to have a spectral transmissivity curve so that the combination of the photodiode and the filter will yield a maximum spectral response in the range of approximately 540 to 580 nanometers; and lamp control circuit responsive to said photodiode for turning said headlamp on or off at predetermined ambient light levels, whereby when the spectral composition of the ambient light changes, the response of said sensor will match the change in brightness perceived by a human observer.

13. The headlamp control system of claim 12 wherein said photodiode alone has a spectral response curve that is generally linear, and increasing with the wavelength of said ambient light.

14. The headlamp control system of claim 12 wherein said filter means is a BG-18 type filter.

15. A headlamp control system for a motor vehicle comprising:

photodiode for receiving ambient light in the vicinity of said vehicle, said photodiode providing a current signal in response to said ambient light;

filter means disposed between said photodiode and said ambient light for selectively transmitting said ambient light to the photodiode, the filter means being chosen to have a spectral transmissivity curve so that the combination of the photodiode and the filter will yield a spectral response curve having a slope with the same sign as the human photopic spectral sensitivity curve at the various wavelengths in the visible light spectrum; and lamp control circuit responsive to said photodiode for turning said headlamp on or off at predetermined ambient light levels, whereby when the spectral composition of the ambient light changes, the response of said sensor will match the change in brightness perceived by a human observer.

* * * * *